2,976,329
Patented Mar. 21, 1961

2,976,329

PREPARATION OF PHENOLS

John B. Braunwarth, Crystal Lake, Ill., assignor to The Pure Oil Company, Chicago, Ill., a corporation of Ohio No Drawing. Filed Sept. 30, 1958, Ser. No. 764,256

13 Claims. (Cl. 260—621)

This invention relates to a method of preparing phenols and alkyl-substituted phenols, i.e., cresols, and aromatic hydrocarbons having at least one unsubstituted nuclear hydrogen atom, by direct oxidation, using a copper compound in the presence of an alkali metal phosphate. In one embodiment of the invention it has been found that only alkali metal phosphates are capable of augmenting the oxidation of aromatic hydrocarbons by reaction with a copper compound and water to produce phenols or cresols. In another embodiment of the invention it has been found that the amount of alkali metal phosphate present during the reaction should be less than the amount of copper compound for best results. It will also be shown that the presence of greater than equal mol ratios of alkali metal phosphate and copper compound, or excess base or acid, results in a reduction of the yield of desired product.

The preparation of phenol and cresols by the direct oxidation reaction of benzene or toluene with copper sulfate and water is known. Starting with benzene, the best yield of phenol that is reported by this reaction is 25 mol percent. The best prior art yield of cresol, starting with toluene and using copper sulfate, is about 12 mol percent, based on toluene converted (about 8.7 mol percent based on copper sulfate). The reaction takes place in the presence of water at temperatures above about 350° F. and at superatmospheric pressures. The reaction can be represented by the equation:

$$CuSO_4 + ArH + H_2O \rightarrow Cu + ArOH + H_2SO_4.$$

It has been found in accordance with this invention that the addition of an alkali metal phosphate, such as tri-sodium phosphate, tri-lithium phosphate and tri-potassium phosphate, particularly in molar amounts less than the molar amount of copper sulfate, gives increased yields of phenol or cresols in this reaction. A further aspect of the invention is the discovery that the presence of between about 0.01 to 0.20 mols of alkali metal phosphate per mol of copper compound is particularly effective.

Accordingly, it is an object of the invention to provide a process for producing phenols and alkyl-substituted derivatives thereof by the direct oxidation of aromatic hydrocarbons having at least one unsubstituted hydrogen atom per molecule in a reaction based on the use of a copper compound, water and added alkali metal phosphate.

It is another object of the invention to provide a process for producing phenols and alkyl-substituted derivatives thereof by direct oxidation of aromatic hydrocarbons having at least one unsubstituted hydrogen atom per molecule in a reaction utilizing a copper compound, water and less than mol-for-mol ratios of alkali metal phosphate based on the mols of said copper compound.

A further object of the invention is to provide a process for producing phenols and alkyl-substituted derivatives thereof by direct oxidation of aromatic hydrocarbons having at least one unsubstituted hydrogen atom per molecule in a reaction based on the use of a copper compound, water and added alkali metal phosphate at temperatures above about 350° F.

Another object of the invention is to provide a process for producing phenols and alkyl-substituted derivatives thereof by direct oxidation of aromatic hydrocarbons having at least one unsubstituted hydrogen atom per molecule in a reaction based on the use of a copper compound, water and less than mol-for-mol ratios of alkali metal phosphate, said ratio being based on the mols of said copper compound, at temperatures above about 350° F.

Another object of this invention is to provide a process for producing phenols and alkyl-substituted derivative thereof by direct oxidation of benzene or toluene in a reaction based on the use of a copper compound, water and added alkali metal phosphate, at temperatures above about 350° F.

And a further object of this invention is to provide a process for producing phenols and cresols by direct oxidation of benzene or toluene in a process based on the use of copper sulfate, water, and between about 0.01 to 0.20 mols of tri-sodium phosphate per mol of copper sulfate.

These and further objects of the invention will be described or become apparent as the specification proceeds.

The process of this invention will be illustrated by a number of examples illustrating the prior art processes, the effect of excess alkali or acid, and the effect of alkali metal phosphate added in accordance with this invention.

*Example 1*

Benzene, copper sulfate pentahydrate and water are mixed in accordance with the prior art in a stainless steel autoclave which is sealed and heated to about 625° F. with constant shaking for a period of about 2 hours. This reaction proceeds with the production of about 25 mol percent of phenol.

*Example 2*

The reaction in Example 1 is repeated using toluene instead of benzene. Only 0.0417 mol, or 8.7 mol percent of cresol is obtained.

*Example 3*

A 3-gallon stainless steel autoclave was charged with 1400 cc. of distilled water, 412.4 gm. of copper sulfate pentahydrate, 1200 cc. of benzene and 22 gm. of concentrated sulfuric acid. The system was sealed and heated at 560° to 580° F. for two hours.

After the system was opened, normal work-up procedure was used. The total amount of phenol collected was 0.19 mol, or a yield of 11.5 mol percent.

*Example 4*

A 115-cc., stainless steel autoclave was charged with 23.5 cc. of distilled water, 12.8 gm. of copper sulfate pentahydrate, 25.0 cc. of benzene and 1 gm. of calcium hydroxide. The system was sealed and heated at 560° to 580° F. for 2 hours. After the reaction period had been completed, the system was opened and the normal work-up procedure was used. The total amount of phenol collected was 0.00865 mol, or a yield of 16.9 mol percent.

The foregoing examples illustrate that carrying out the reaction under neutral conditions produces better yields of phenol from benzene than are produced by applying conditions wherein excess acid is available. These examples also illustrate that although the presence of excess alkali is beneficial in that more phenol is produced than with excess acid, the yield is not as high as when substantially neutral conditions are maintained.

Example 5

Into a 115-cc., stainless steel autoclave were placed 23.5 cc. of distilled water, 12.75 gm. of copper sulfate pentahydrate (0.051 mol), 23.5 gm. of benzene and 1 gm. of trisodium phosphate dodecahydrate. The system was sealed, heated to 580° F. and maintained at this temperature for two hours. The system was then allowed to cool to room temperature and the reaction mixture collected. The precipitate of copper was removed by filtration and the benzene phase was separated and collected. The aqueous phase and filter cake were washed five times with 30-cc. portions of toluene, and the combined benzene and toluene phases were analyzed for phenol by titration with aqueous iodine solution. The yield of phenol was 0.0189 mol.

The aqueous phase was distilled and the overhead aqueous distillate was analyzed for steam-volatilized phenol. The yield of phenol was 0.0023 mol, making the total phenol formed in the reaction 0.0212 mol, or a yield of 41 mol percent in comparison to the yield of about 25 mol percent (max.) in Example 1. Thus the yield was increased 66%.

Example 6

Again using a 115-cc., stainless steel autoclave, 23.5 cc. of distilled water, 12.8 gm. of copper sulfate pentahydrate, 23.5 gm. of toluene and 1 gm. of Kelite (a trisodium phosphate compound) were charged. The system was sealed and heated at 560° F. for two hours. Once the system was opened, the reaction mixture was worked up in a manner similar to Example 5. The total amount of cresol collected was 0.00481 mol, or a yield of 9.4 mol percent based on copper sulfate.

The best prior art yield of cresol (without trisodium phosphate) is reported as approximately 12% based on toluene converted, which is equivalent to a percentage yield of 8.7 mol percent based on copper sulfate. At comparable conditions, a yield of 9.4 mol percent, based on copper sulfate converted, is realized by the use of trisodium phosphate in accordance with this invention. Thus, the yield is increased by about 15.5%.

In order to illustrate that other alkaline salts of weak acids do not function in this reaction, the following examples are presented:

Example 7

Using a 115-cc., stainless steel autoclave, 23.5 cc. of distilled water, 12.8 gm. of copper sulfate pentahydrate, 23.5 cc. of benzene and 1 gm. of potassium carbonate were charged. The system was sealed and heated at 650° F. for 2 hours. After the system was opened, normal work-up procedure was used. The total amount of phenol collected was 0.00079 mol, or a yield of only 1.6 mol percent.

Example 8

Using a 115-cc., stainless steel autoclave, 23.5 cc. of distilled water, 12.8 gm. of copper sulfate pentahydrate, 27 cc. of benzene and 1 gm. of sodium borohydrate were charged. The system was sealed and heated at 620° F. for 2 hours. After the system was opened, normal work-up procedure was used. The total amount of phenol collected was 0.00215 mol, or a yield of only 4.2 mol percent.

The invention is applicable to the use of alkali metal phosphates which group includes tri-sodium phosphate, tri-potassium phosphate, tri-lithium phosphate, di-sodium phosphate, di-potassium phosphate, di-lithium phosphate, mono-sodium phosphate, mono-potassium phosphate, and mono-lithium phosphate. Of these orthophosphoric acid salts, the tri-alkali metal or normal salts are preferred.

The copper compounds used may be of the cuprous or cupric variety although the latter are preferred. In general, the reaction may be carried out using copper salts which function in the manner of copper sulfate. The copper compounds may be illustrated by copper sulfate (anhydrous), copper sulfate pentahydrate, copper phosphate, copper chloride, copper acetate and the like.

The amounts of aromatic hydrocarbon used may vary from about 1 to 10 mols per mole of copper compound to be reacted. Preferably an excess of aromatic hydrocarbon is used. Since it requires one molecule of water to react with one molecule of copper compound to form one molecule of phenol, there should be sufficient water present to react with all of the copper compound. Preferably, a relatively large amount of water is used in the reaction. In general, it is preferred to use at least about 10 mols of water per mol of aromatic hydrocarbon feed to the reaction zone. However, higher mol ratios of water to hydrocarbon may be used as, for example, mol ratios of about 20:1 to as high as 100:1. Excessive amounts of water do not interfere with the reaction. For best results, at least about 10 mols of water per mol of hydrocarbon should be used.

The amounts of copper salt should be at least greater than the amount of alkali metal phosphate present. If mol-for-mol amounts of alkali metal phosphate and copper salt or greater than mol-for-mol amounts are used, the yield of phenol, for example, will be reduced to less than that obtained if no alkali metal phosphate is present. Accordingly, the amount of alkali metal phosphate should be regulated so that less alkali metal phosphate is present than copper compound. In general, between about 0.01 to 0.2 mol of alkali metal phosphate is used per mol of copper compound for best results. The preferred ratio of alkali metal phosphate to copper compound is about 0.03 to 0.1.

The reaction is carried out either batchwise or continuously. In batchwise operation the oxidation is maintained under conditions of pressure and temperature such that a part of the water is maintained in the liquid phase, although the phase relationship of the reactants does not appear to influence the reaction. In continuous operation, the aromatic hydrocarbon and water are passed in vapor phase through a fixed bed of the copper compound admixed with the alkali-metal phosphate. Fluidized operation may also be applied.

The temperature must be maintained above about 350° F. for the reaction to proceed. A preferred reaction temperature is between about 350° to 710° F. with optimum results being achieved at about 500° to 675° F. Side reactions are promoted by the use of higher temperatures than 710° F. Although prior art processes operate at a low conversion per pass and depend on recycling of the aromatic hydrocarbon to increase the yields, such a procedure is not mandatory in the instant process because the yields are substantial on a single-pass basis. However, recycling will also increase the yields considerably in the instant process.

The aromatic hydrocarbons used as feed to the process include benzene, naphthalene, and alkyl-substituted derivatives thereof, having at least one unsubstituted nuclear hydrogen atom. The alkyl group attached to the aromatic nucleus may contain from 1 to 18 carbon atoms and may be straight-chain, branched-chain, or alicyclic. Examples of suitable feed hydrocarbons include benzene, toluene, ortho-xylene, meta-xylene, para-xylene, ethylbenzene, the trimethyl benzenes, propylbenzene, cymene, durene, isodurene, mellitene and prehnitene, phenylbenzene, diphenylene, p-diphenyl benzene, diphenylmethane, 1,1-diphenylmethane, dibenzyl, triphenylmethane, indene, naphthalene, 1,2,5-trimethylnaphthalene, anthracene, and phenanthren.

The process may be conducted by recovery of the elemental copper formed during the reaction, dispersion of same in water, and transformation to the copper compound used as initial reactant. Although the invention has been illustrated by way of certain examples, the only limitations attaching thereto appear in the appended claims.

What is claimed is:

1. The process for producing phenols which comprises reacting an aromatic hydrocarbon having at least one unsubstituted nuclear hydrogen atom with water, an alkali metal phosphate and a copper salt selected from the group of copper sulfate and copper sulfate pentahydrate at a temperature in the range of about 350° to about 710° F., under super atmospheric pressures, about 1 to 10 mols of said aromatic hydrocarbon being present per mol of said copper salt, the amount of said water being sufficient to react with said copper salt and about 0.01 to 0.20 mol of said alkali metal phosphate being present per mol of said copper salt.

2. The process in accordance with claim 1 in which the aromatic hydrocarbon is selected from the group of benzene, naphthalene, and anthracene, and alkyl derivatives thereof wherein the alkyl radicals contain from 1 to 18 carbon atoms.

3. The process in accordance with claim 2 in which the alkyl groups are straight-chain.

4. The process in accordance with claim 2 in which the alkyl groups are branched.

5. The process in accordance with claim 2 in which the alkyl groups are alicyclic.

6. The process in accordance with claim 1 in which the alkali metal phosphate is selected from the group of tri-sodium phosphate, tri-potassium phosphate and tri-lithium phosphate.

7. The process in accordance with claim 6 in which the alkali metal phosphate is tri-sodium phosphate.

8. The process in accordance with claim 1 in which about 0.05 mol of said alkali metal phosphate is present for each mol of said copper salt.

9. The process for producing phenol which comprises heating benzene with water, an alkali metal phosphate and a copper salt selected from the group consisting of copper sulfate and copper sulfate pentahydrate, to a temperature in the range of about 350° F. to about 710° F. and under sufficient pressure to maintain a part of the water in the liquid phase, about 1 to 10 mols of benzene being present per mol of said copper salt, the amount of said water being sufficient to react with said copper salt, about 0.01 to 0.20 mol of said alkali metal phosphate being present per mol of said copper salt and separating phenol from the reaction mixture.

10. The process in accordance with claim 9 in which said alkali metal phosphate is selected from the group of tri-sodium phosphate, tri-potassium phosphate and tri-lithium phosphate.

11. The process is accordance with claim 10 in which said alkali metal phosphate is tri-sodium phosphate.

12. The process in accordance with claim 9 in which about 0.05 mol of said alkali metal phosphate is present per mol of said copper salt.

13. The process of producing cresols which comprises heating toluene with water, an alkali metal phosphate and a copper salt selected from the group of copper sulfate and copper sulfate pentahydrate to a temperature in the range of about 350° to about 710° F. and under sufficient pressure to maintain a part of said water in the liquid phase, about 1 to 10 mols of toluene being present per mol of said copper salt, the amount of said water being sufficient to react with said copper salt, about 0.01 to 0.20 mol of said alkali metal phosphate being present per mol of said copper salt and separating cresols from the reaction mixture.

References Cited in the file of this patent

UNITED STATES PATENTS

| | | |
|---|---|---|
| 2,727,926 | Kaeding et al. | Dec. 20, 1955 |
| 2,760,991 | Toland | Aug. 28, 1956 |